United States Patent
Habisreitinger et al.

(10) Patent No.: US 6,354,426 B1
(45) Date of Patent: Mar. 12, 2002

(54) DEVICE FOR POSITIONING VEHICLES STANDING ON THEIR OWN WHEELS IN A MANNER WHICH IS SUITABLE FOR AUTOMATION AND FOR VEHICLES OF DIFFERENT TYPES

(75) Inventors: Uwe Habisreitinger, Freudenstadt; Bernhard Nordmann, Boeblingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/623,424
(22) PCT Filed: Feb. 23, 1999
(86) PCT No.: PCT/EP99/01167
§ 371 Date: Nov. 8, 2000
§ 102(e) Date: Nov. 8, 2000
(87) PCT Pub. No.: WO99/44879
PCT Pub. Date: Sep. 10, 1999

(30) Foreign Application Priority Data

Mar. 5, 1998 (DE) .......................... 198 09 515

(51) Int. Cl.⁷ ............................................. B65G 47/22
(52) U.S. Cl. .................. 198/345.3; 198/345.1
(58) Field of Search ............ 198/339.1, 341.05, 198/343.1, 345.1, 345.3, 817; 104/162

(56) References Cited

U.S. PATENT DOCUMENTS

| | | | |
|---|---|---|---|
| 5,143,196 A | * | 9/1992 | Henn et al. ............... 198/345.3 |
| 5,191,958 A | * | 3/1993 | Tolocko ............... 198/345.1 X |
| 5,651,319 A | | 7/1997 | Sugahara ..................... 104/162 |
| 5,984,085 A | * | 11/1999 | Ponzio et al. ......... 198/345.3 X |
| 6,196,372 B1 | * | 3/2001 | Rossi ...................... 198/345.1 |

FOREIGN PATENT DOCUMENTS

| | | |
|---|---|---|
| DE | 31 47 784 A1 | 6/1983 |
| FR | 2 399 370 | 3/1979 |
| JP | 56 043069 | 4/1981 |
| JP | 60 040311 | 3/1985 |

* cited by examiner

Primary Examiner—James R. Bidwell
(74) Attorney, Agent, or Firm—Crowell & Moring LLP

(57) ABSTRACT

In an apparatus for the conveyance and positioning of a vehicle supported on its own wheels along a production line, the vehicle wheels of each vehicle side are assigned conveying systems, for example apron conveyors or drag-chain conveyors, by means of which the vehicles can be moved further on in strokes. So that the vehicles can be positioned and oriented accurately and efficiently in the longitudinal and transverse directions in an automation-compatible and type-flexible way, in each workstation, the two wheel tracks are assigned in each case a prismatic shaped wheel well which can accept variously sized wheels in the same position. The vehicle wheels are supported transversely displaceably therein. Furthermore, a wheel support is arranged at a distance from the wheel wells and can support the wheels of the other vehicle axle likewise so as to be transversely displaceable. The wheel supports cover the various center distances of all the vehicle types occurring in the production line. The same applies to the width of the rolling tracks, the wheel wells and the wheel supports. Each of the wheel wells and the wheel supports has a pair of movably guided centering edges which project above the rolling level of the rolling tracks and which can be laid against mirror-symmetrical sides of the vehicle tires and can be moved by means of a centering mechanism transversely to the conveying direction positively in synchronism and mirror-symmetrically to the center line of the production line.

14 Claims, 5 Drawing Sheets

DEVICE FOR POSITIONING VEHICLES STANDING ON THEIR OWN WHEELS IN A MANNER WHICH IS SUITABLE FOR AUTOMATION AND FOR VEHICLES OF DIFFERENT TYPES

BACKGROUND AND SUMMARY OF THE INVENTION

This application claims the priority of PCT International Application No. PCT/EP99/01167, filed Feb. 23, 1999 (23.02.99) and German patent document DE 198 09 515.5, filed Mar. 5, 1998 (05.03.98), the disclosures of which is expressly incorporated by reference herein.

The invention is directed to an apparatus for intermittent conveyance and positioning of vehicles rolling on their own wheels within a production line such as used, for example, in the industrial mass production of passenger cars.

In the area of final assembly of passenger cars, it is customary after the assembly of the chassis (from which moment on the vehicles stand on their own wheels) to convey the vehicles through the subsequent assembly areas by means of apron conveyors or on runners or by means of drag chains. When vehicles are conveyed by means of slat or apron conveyors, they stand with the vehicle wheels on two slat or apron conveyors which are laid parallel to one another in the floor of the working line according to the gauge of the vehicle wheels, and are driven slowly. Individual aprons or slats can be supported on the bottom via rollers, so that the composite apron or slat structure can easily be moved forward in spite of the load exerted on individual aprons or slats by the vehicles bearing down on them.

In transport by runners, the vehicles stand with the two left-hand and the two right-hand wheels on a rail of U-shaped profile which extends over the entire vehicle length, so as to form the two runners. These runners are moved along the working line by apron conveyors laid in the floor on the right and left or in each case by means of a closely packed sequence of drivable conveying rollers. The advantage of transport by runners is that the vehicles standing on runners can be offset transversely or rotated about a vertical axis in corresponding offsetting devices. The vehicles can therefore be handled more universally, standing on runners, than when they are conveyed directly, standing on their own wheels, by slat or apron conveyors or by drag chains.

In transport by drag chains, the vehicles roll on their own wheels through the production line along rolling tracks, a drag chain or a pair of drag chains being arranged along the rolling track of one side of the vehicle approximately at the interval of a wheel width. The drag chains are provided with drivers which apply a thrust to a vehicle wheel, and convey the vehicle through the production line.

The vehicles conveyed by means of these conveying techniques do not come to a standstill in a defined position at the individual workstations. In the area where these conveying techniques are used, positional tolerances of a specific body point of ±10 to 20 cm in the longitudinal and/or transverse directions must be allowed for. This wide spread in position is not permissible for tasks which are to be carried out in an automated and mechanized way and which presuppose a knowledge of the exact actual position in all three positions in space.

So that an exact actual position can be determined when there is such a pronounced spread in the position of the vehicles, it would first be necessary to determine the approximate actual position of the vehicle in each case by means of a preceding measuring step; the vehicle would first, as it were, have to be "located". Only then could this be followed by a more accurate measuring programme with complex sensor technology in order to determine the exact actual position. Moreover, since fixed or reference points, suitable for the measuring systems used in this case, on the outer skin of the vehicles vary according to the type of vehicle and are themselves even subject to some tolerances, in addition to the outlay in terms of time and investment, there would also be a problem, in detecting the actual position of the vehicles at the individual workstations accurately in each case. The productivity (which it is, of course, the precise aim to increase by the use of automation techniques) would be greatly impaired in view of the time spent in determining the exact actual position. Under some circumstances, the time gained by automation as compared with manual work, would be effectively lost by the time spent in detecting the actual position, so that automation is not worthwhile.

In the assembly areas which precede chassis assembly (and where various scopes of work are automated and mechanized) at the individual workstations the vehicle bodies are normally lifted out of the conveying slides by means of centering cones (which move into body-side reference bores) and a lifting device, and are brought very quickly into a spatial position exactly defined by means of stops. However, this technique cannot be transferred to the assembly area following the chassis assembly, since, at this later assembly stage, the vehicle floor no longer has any facilities, accessible on the underside and exactly defined spatially, for receiving the vehicles, and the previously free centering receptacles are built over and/or closed with type-specifically different components.

One object of the invention is to improve the basic generic apparatus, to the effect that vehicles of different type rolling on their own wheels can be efficiently and accurately positioned and oriented automation-compatibly and type-flexibly within a workstation of a production line in the conveying direction and transversely thereto. The term "accurately" is intended to cover a relatively small tolerance range in positioning, within which particular work operations can be carried out readily in a mechanized way or in which the vehicle can very quickly be oriented and fixed mechanically with even greater accuracy via jack attachment points or similar points on the vehicle by means of a fixed apparatus within the workstation.

This and other objects and advantages are achieved by the apparatus according to the invention, in which the vehicle is positioned longitudinally and transversely within a workstation by means of the tires. For positioning in the longitudinal direction, a pair of prismatic wheel wells is provided, in which the vehicle wheels are received exactly in position in the longitudinal direction, but floatingly in the transverse direction. Even in the case of different wheel sizes occurring in practice, this arrangement consistently achieves a longitudinal positioning of the associated vehicle axis at the same point; to be precise, centrally above the wheel wells. Transversely to the conveying direction, the vehicles can be centered exactly with the middle of the conveying line by means of the transversely floating support of the vehicle wheels and by means of a centering mechanism engaging on the tire flanks by means of centering edges and arranged so as to be countersunk in the floor of the workstation.

By the vehicles being centered in the middle, a transverse positioning which is uniform, irrespective of the track width and wheel width, is achieved. Since the centering edges bear only on the tire flank, contact with or damage to the rims is ruled out. By the vehicles being positioned according to the invention, a positional tolerance of the vehicles of approximately ±5 mm in the longitudinal and transverse directions can readily be achieved. So long as certain approximate filling-pressure tolerances for all the tires are maintained, this accuracy is not impaired by varying air pressure in the tires. Due to the rapid and accurate positioning of the vehicles conveyed into a new workstation, the invention facilitates the use of automation techniques in the ultimate phase of the final assembly of vehicles.

Where steerable axles are concerned, the centering edges should expediently be mounted pivotably on the associated centering mechanism, so that the centering edges can come to bear, without tilting, on the tire flanks; and, when the vehicle is being centered, no action involving force is exerted on the vehicle steering. Different type-specific center distances are taken into account by means of correspondingly long carrying rollers or floatingly mounted receiving surfaces.

Other objects, advantages and novel features of the present invention will become apparent from the following detailed description of the invention when considered in conjunction with the accompanying drawings.

DETAILED DESCRIPTION OF THE DRAWINGS

Figure 1:
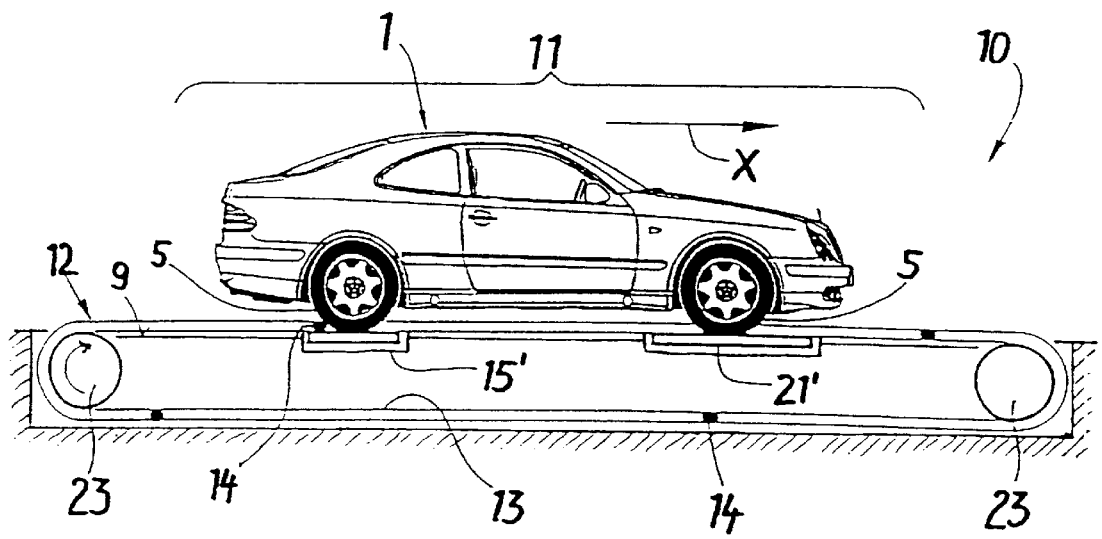
FIG. 1 shows a vertical longitudinal section through a first exemplary embodiment of a conveying apparatus for the intermittent conveyance of vehicles rolling on their wheels in the region of a workstation, using a drag-chain conveyor.

In the exemplary embodiments illustrated, the invention is shown in two different basic versions which differ from one another in the nature of the conveying lines 12 and 12' below the vehicle wheels 5. On the one hand, several exemplary embodiments are illustrated, which show (FIGS. 1 and 2) or presuppose (FIGS. 3 to 8) a drag-chain conveyance of the vehicles. In the drag-chain conveyance of the vehicles, one of the conveying lines 12 is designed as a rolling track 9, supplemented by a drag-chain conveyor 13, 14, 23, whereas there is no conveying line provided on the other side of the vehicle, but merely a rolling track 9. The vehicle wheels can roll freely on the rolling tracks 9. Here, the wheel wells and wheel stand-on plates are assigned to the individual workstations 11 in a stationary manner.

In the exemplary embodiment according to FIG. 10, the conveying lines below the vehicle wheels on each side of the vehicle are designed in each case as apron conveyors. The vehicle wheels stand on wheel wells 36 or wheel stand-on plates 37 which are integrated into the composite articulated structure of the movable apron conveyors. By the apron conveyors being stopped in the correct position, after each conveying stroke the wheel wells 36 and wheel stand-on plates 37 are in each case repositioned at the individual workstations 11'.

Figure 2:
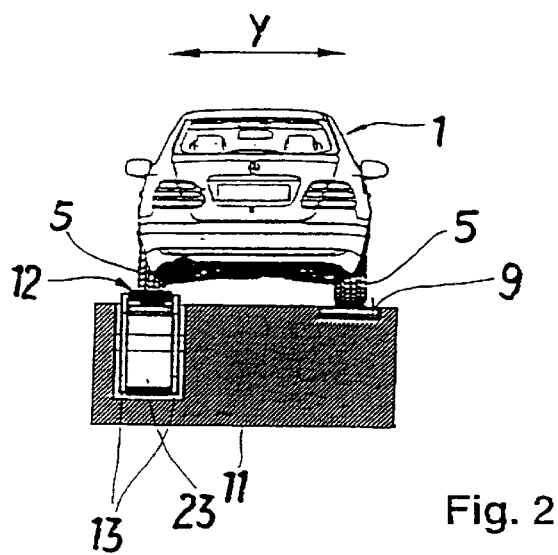
FIG. 2 shows a vertical cross section through the conveying apparatus according to FIG. 1.

The exemplary embodiments with drag-chain conveyance will be dealt with in more detail first, one of which is shown in a more comprehensive illustration in FIGS. 1 and 2. This is, in general terms, an apparatus for the intermittent conveyance and positioning of vehicles 1 rolling on their own wheels 5 along a production line 10 which, in the exemplary embodiment illustrated, comprises a workstation 11. The vehicles on the production line jointly execute a conveying stroke corresponding to the distance between stations by means of the conveying lines and are stopped again and positioned in order to carry out work. For this purpose, two rolling tracks 9 for the vehicle wheels 5 are provided next to one another in parallel and are arranged at a distance corresponding to the gauge of the vehicles 1.

One rolling track is assigned a pair of drag chains 13 which are laid in an endless loop over deflecting wheels 23 and are driven in the conveying direction X. The pair of drag chains is laid with its upper strand following the rolling track being near the floor. Moreover, the drag chains are provided with a plurality of drivers 14, which can be positioned to apply a thrust against the circumference of a vehicle tire 5 of a vehicle 1 to be conveyed. The drivers may be designed as a triple set of parallel rollers or cylinders which touch one another and are rotatably mounted and of which one roller rolls on the rolling track and the other two roll on the tire circumference.

So that vehicles of different types which roll on their own wheels can be exactly and efficiently positioned and aligned automation-compatibly and type-flexibly within a workstation 11 of the production line in the conveying direction X and in the transverse direction Y, a package of measures is provided according to the invention.

A prismatic center-symmetrical wheel well 15' with a center line 31 is arranged in each case in each rolling track 9 in the region of the workstations 11. Several exemplary embodiments of wheel wells are presented in more detail below. The wheel wells are oriented transversely to the conveying direction X and are arranged in the same position relative to one another, with respect to the conveying direction, in the rolling tracks 12. They are arranged in a stationary manner within the workstation 11 according to the desired position of the vehicle 1 or of the respective vehicle axle 2, 3. The wheel wells are shaped, in cross section, such that variously sized vehicle tires 5 of all the vehicle types occurring in the production line 10 can be received in them in a positionally accurate manner. In all the exemplary embodiments, the wheel wells are designed in such a way that the vehicle tire 5 of the vehicle wheel received in them is supported displaceably in the transverse direction Y.

Furthermore, wheel stand-on supports 21 are provided in the rolling tracks 9 at a longitudinal distance from the wheel wells which corresponds to the center distance A of the vehicles. (See FIG. 3.) The supports are formed by a set of parallel carrying rollers 22 oriented with their axes of rotation in the conveying direction X (FIGS. 3 and 4 or FIGS. 5 and 6). Alternatively, the wheel stand-on supports 21' may also be designed as a transversely floatingly guided plate (FIG. 1 or 7). The wheel stand-on supports 21, 21' cover the various center distances A of all the vehicle types occurring in the production line 10. In the exemplary embodiments illustrated, this is achieved, despite the wheel stand-on supports' being arranged at a fixed location, in that they are dimensioned (dimension L) to be longer in the conveying direction X than the sum of the wheel stand-on area and the difference D between the largest and smallest center distance A occurring.

So that all the gauges S and wheel widths b of all the vehicle types occurring in the production line 10 can also be covered, the width, measured in the transverse direction Y, of the rolling tracks 9, the width B of the wheel wells and the width of the wheel stand-on plates are in each case dimensioned, taking into account their mutual transverse distance, such that said elements, despite being arranged at a fixed location in the workstations, can readily cover the occurring or possible range of gauges and tire widths.

For centering, each two opposite wheel wells and two wheel stand-on supports of each workstation 11 is assigned a pair of movably guided longitudinally oriented centering edges 25 and 25' which project beyond the rolling level of the rolling tracks 9. These edges can be laid against mirror-symmetrical flanks 6 of the vehicle tires 5 of a vehicle received at the workstation. (What is illustrated is a situation where the centering edges come to bear on the inside, which is expedient for reasons of space.) For this purpose, the centering edges 25 and 25' are arranged in each case at a mutual transverse distance such that they can be laid in a centering manner against the inside tire flanks 6 and can be moved outwards away from the middle 24 for centering the vehicle wheels 5. The centering edges 25 assigned to the wheel stand-on plates are connected immovably to the associated centering mechanism, which is dealt with in more detail below. Moreover, the centering edges 25 assigned to the wheel stand-on plates are approximately as long as the wheel stand-on plates (dimension L) . The height of the centering edges is selected such that, even in the case of low-section tires, they do not come into contact with the rim of the vehicle wheel, so that damage cannot occur there.

The non-steerable wheels are accurately aligned in the conveying direction X, apart from a slight skew position of the vehicle on the rolling tracks which, incidentally, is to be eliminated. By contrast, the centering edges 25' assigned to the steerable vehicle axle 2 are held on the associated centering mechanism 26 so as to be pivotable about a vertical pivot axis 27, so that, when the steerable vehicle wheels are standing obliquely, the centering edges do not come to bear against the tire flanks in an angular way, but can automatically fit snugly onto the tire flank. Incorrect positioning can thereby be avoided. As seen in horizontal projection, the pivot axis 27 is arranged approximately at the position of the transversely running center line 4 of the steerable vehicle axle 2 of the vehicle 1 received in position.

Provided in each case in the drive for moving each pair of centering edges 25, 25' is a centering mechanism which is described below in several exemplary embodiments. By means of the centering mechanism, the two opposite centering edges can be moved transversely, (that is, in the direction Y) positively in synchronism and mirror-symmetrically in relation to the center line 24 of the production line 10, and, by means of the said centering mechanism, the vehicle can be oriented via the tires symmetrically and parallel to the center line 24 of the production line.

Before the procedure for positioning the conveyed vehicles is dealt with in more detail, further particulars of the exemplary embodiments which are relevant to the positioning sequence will be described beforehand.

As already mentioned, there are various possibilities for the configuration of the wheel wells. In principle, they are designed with a prismatic cross section and symmetrically with a horizontal bottom and inclined flanks. The differences are attributable to whether the wheel load is absorbed by the two inclined well flanks 16 or by the horizontal bottom 17.

Figure 3:
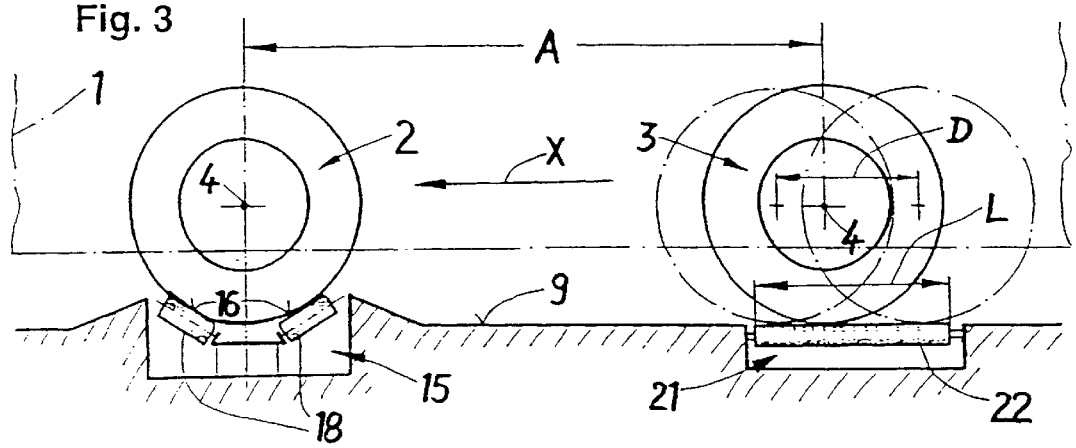
FIG. 3 shows a vertical longitudinal section through a workstation with an apparatus for the exact positioning of a vehicle rolling on its wheels, as a further exemplary embodiment.
Figure 4:
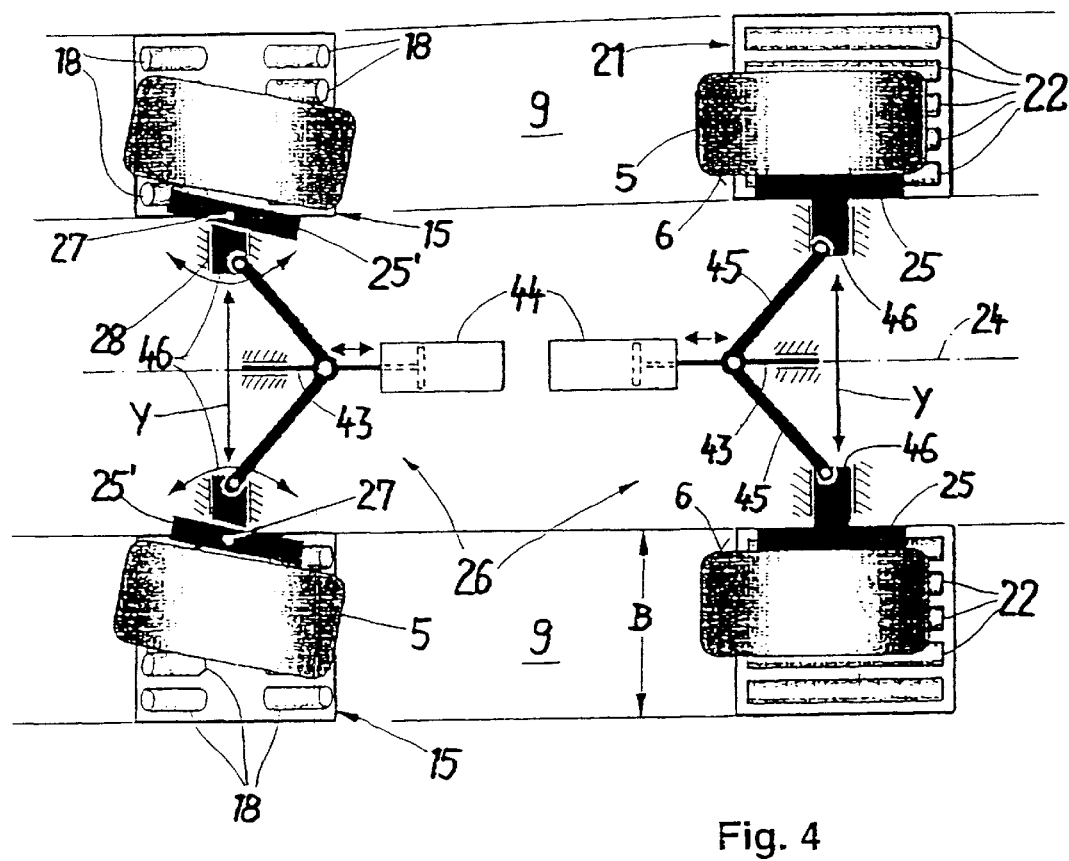
FIG. 4 shows an illustration in horizontal projection of the apparatus at the workstation according to FIG. 3.

In the exemplary embodiment of the wheel wells 15 which is illustrated in FIGS. 3 and 4, the inclined flanks 16 absorb the wheel load. The flanks are accordingly arranged immovably with respect to their inclination and/or the distance between them. So that the vehicle wheel received therein can easily be displaced, and the vehicle thus centered, in the Y direction the inclined flanks 16 are formed by a set of parallel carrying rollers 18, of which the axes of rotation, as seen in horizontal projection, are oriented parallel to the conveying direction X. On the one hand, as large a number of carrying rollers as possible should be provided, so that the wheel received in the wheel well can easily be displaced on them. This entails a short distance between them and therefore also a small diameter of the carrying rollers. On the other hand, for reasons of sufficient stability, the carrying rollers cannot be made as small as might otherwise be desired. A practicable compromise must therefore be made.

Instead of the inclined flanks of the wheel wells absorbing the wheel load being designed in the form of a set of carrying rollers, it is also possible for the well flanks to be designed as transversely floatingly guided plates. These are steel plates which are provided at their transverse lateral margins, on the underside, with dust-protected linear rolling-bearing guides which, on the one hand, allow easily moving transverse guidance of the wheel received and, on the other hand, make it possible to have a stand-on surface, continuous over a large area, for the tire (so-called tire contact area) on the inclined plates. So that, after a vehicle wheel is newly placed onto a transversely floatingly mounted plate, there is sufficient clearance for movement to the right and to the left for positioning in the transverse direction, each plate is equipped with a centering spring which, after being relieved, returns the floatingly mounted plate into a middle position. In this manner, a wheel can always be placed onto a plate which is in the middle position within a clearance for its movement.

The exemplary embodiment, shown in FIGS. 3 and 4, of a pair of opposite wheel wells with immovably arranged flanks 16 absorbing the wheel load has the advantage that the tires of a respective vehicle axle are automatically positioned in the longitudinal direction X after the vehicle axle has rolled into the two opposite wheel wells, without further activity. One disadvantage is some unevenness of the rolling tracks in the region of the wheel wells, which may, under certain circumstances, disrupt a jolt-free transportation of the successive vehicles conveyed by the drag chain. As regards the design of the wheel wells according to FIGS. 3 and 4, after the vehicle is positioned in the longitudinal direction X after the respective vehicle axle has rolled into the associated wheel well, it merely needs to be oriented and centered in the transverse direction Y parallel to and symmetrically to the center line 24 of the workstation by the actuation of the centering mechanism and by the centering edges coming to bear against the inner lateral flanks. Where the wheel wells according to FIGS. 3 and 4 are concerned, therefore, positioning of the vehicle takes place first in the longitudinal direction and then in the transverse direction.

In the exemplary embodiment of the wheel well 15" as shown in FIG. 7, the flanks are movable as regards the distance between them. In this wheel well, the wheel load is absorbed by the horizontal bottom 17 which is designed as a transversely floatingly guided plate. The design of such a plate is entirely similar to that which was described above in connection with the other wheel well according to FIGS. 3 and 4. The well flanks do not absorb any wheel load here, but, at most, forces for positioning the vehicle wheel into the desired position. Here, therefore, the well flanks are designed displaceably and, in the exemplary embodiment according to FIG. 7, as a pair of strips or wedges 19 of triangular cross section, which, after the vehicle wheel has come to a stop in the interspace between the wedges, are moved together positively in synchronism and symmetrically in the direction of the arrows oriented parallel to the X-direction and, at the same time, position the vehicle wheel in the X-direction. While the vehicle is being transported into the approaching position, the wedges 19 are shifted out of the region of the rolling tracks, so that the wheels can roll over the wheel wells unimpeded. During the transportation of the vehicles, the two strip-like wedges 19 can be drawn away laterally out of the region of the rolling tracks, preferably towards the center 24. Because shorter movement strokes are involved, it seems more expedient for the strip-like wedges 19 to be lowered below the rolling level of the rolling tracks into small recesses in front of and behind the floating plate of the well bottom.

In order to position the vehicle in the workstation according to FIG. 7, because of the different design of the wheel wells the operation is opposite to that described further above in connection with FIGS. 3 and 4. That is, the vehicle 1 dragged into the workstation is prepositioned there only approximately in the longitudinal direction by the strip-like wedges 19 being raised in due time above the rolling level of the rolling tracks. Specifically, the wedges 19 are raised exactly when the axle assigned to the wheel well (here the non-steerable axle 3) has just reached the wheel well 15". Subsequently, the approximately prepositioned vehicle is centered and oriented exactly in the transverse direction Y and only thereafter is fine-positioned in the longitudinal direction X, in that the strip-like wedges 19 are moved together by means of a suitable centering mechanism in the direction of the arrows positively in synchronism and symmetrically to the centering line of the wheel well. As a result, the vehicle wheels, which are initially only approximately prepositioned in the wheel well 15", are moved towards the center line 31 of the wheel well and are fixed accurately in position there. It also becomes clear, then, that in this type of wheel well it is more expedient for longitudinal positioning to be carried out last because, after longitudinal positioning, the strip-like wedges 19 bear with some prestress against the tire circumferences and transverse displacement would subsequently be possible only with increased resistance.

Figure 7:
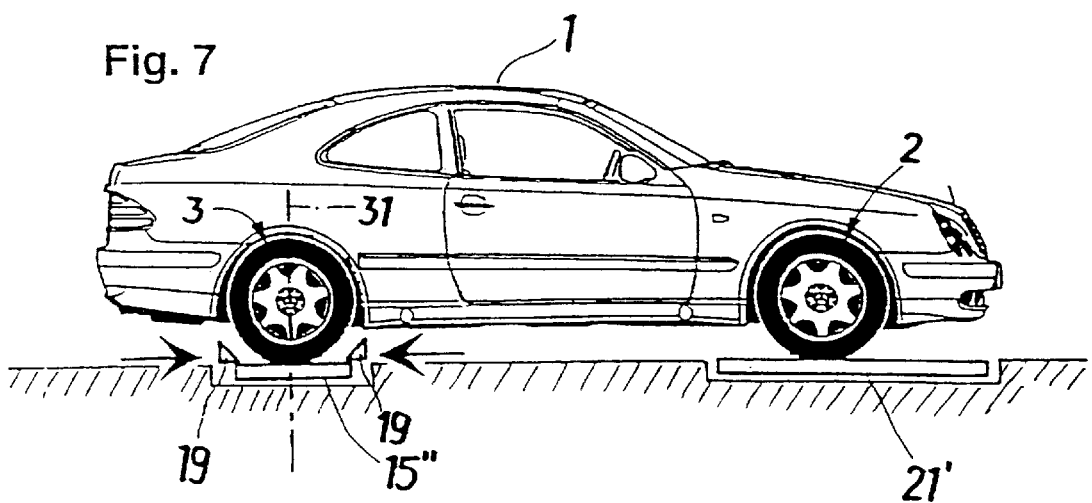
FIG. 7 shows a vertical longitudinal section through a workstation with means for the positioning of vehicles, as a fourth exemplary embodiment.
Figure 8:
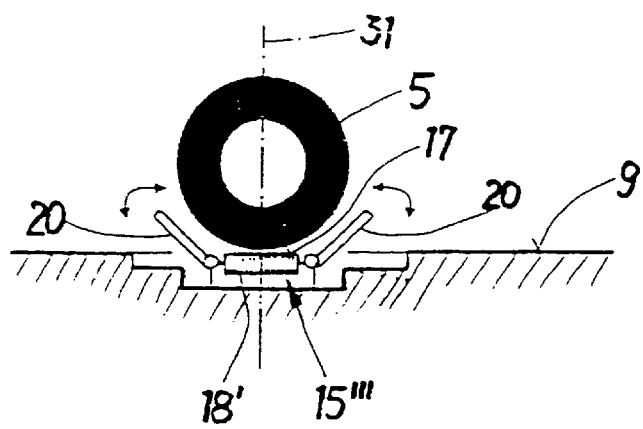
FIG. 8 shows a vertical longitudinal section through a wheel well, the inclined flanks of which are designed in the form of pivotable flaps.

The further exemplary embodiment of a wheel well 15, as illustrated individually in FIG. 8, likewise follows the principle of the wheel well 15" according to FIG. 7, in which the wheel load is absorbed by the bottom 17 of the wheel well 15. Here, however, the bottom is formed by a set of parallel carrying rollers 18', the axes of rotation of which are oriented parallel to the conveying direction. The vehicle can thereby easily be centered in the Y-direction. Here, the well flanks are variable in terms of their inclination and are formed by a pair of pivotable flaps 20 which can be moved together by means of a mechanism (not shown) likewise positively in synchronism and symmetrically in the direction of the pivoting arrows, the vehicle wheel being positioned in the X-direction. During the transportation of the vehicles, the pivotable flaps 20 can be lowered, flush with the surface, to the level of the rolling tracks. The procedure for positioning a vehicle which has moved into the associated workstation is entirely similar to the sequence outlined in connection with FIG. 7.

Expediently, the pivotable centering edges 25' are assigned to the wheel wells, which means that the vehicle is positioned in the longitudinal direction X via the wheels of the steerable vehicle axle. To be precise, if, as seen in horizontal projection, the pivot axes 27 of the centering edges are arranged at the position of the transversely running center line of the wheel wells, this arrangement can ensure in the simplest and most effective way possible that these pivot axes also lie at the position of the center line of the steerable vehicle wheels, which is important for an operationally reliable and accurate centering of the vehicle axle.

The centering edges of the centering mechanism assigned to the steerable vehicle axle 2 should not execute any movement to the longitudinal direction during centering, because this may react on the steering of the wheels, on their steering-lock position and on the centering accuracy, which is undesirable. The pivotable centering edges must be moved along a straight line which, as seen in horizontal projection, runs transversely to the conveying direction. The associated centering mechanism is therefore provided with a transversely oriented straight guide 28 for the part which carries the pivot axes 27 of the associated centering edges 25'.

By the vehicles being positioned according to the invention, they are positioned with sufficient accuracy in the longitudinal and transverse directions, so that some jobs (for example the application of protective film) can be readily automated. Due to air-pressure differences in the tires and because of different suspension compression states, an accurately reproducible positioning of the body with regard to the vertical direction cannot be carried out with the same accuracy. Should the automation of other jobs necessitate or presuppose an exact vertical positioning and/or an even more accurate longitudinal and transverse positioning than is possible according to the invention, then a mechanical apparatus must be provided at the respective workstation, which moves with centering journals into the body-side jack bushes and at the same time orients and positions the vehicle even more accurately in respect of all three spatial directions. Due to the sufficiently accurate positioning of the vehicle by means of the apparatus according to the invention, this even more accurate positioning of the vehicle can be brought about very quickly. In this case, the vehicle is also reliably fixed mechanically and cannot yield in an uncontrolled manner when forces are exerted on the vehicle as a result of the production operation. This additional positioning and fixing unit must be coupled functionally in control terms to the conveying lines and the positioning units, in such a way that the additional positioning and fixing unit is the last of the units mentioned to fix the body after a conveying stroke and is the first to release the body again after the end of the work and before a new conveying stroke.

Figure 10:
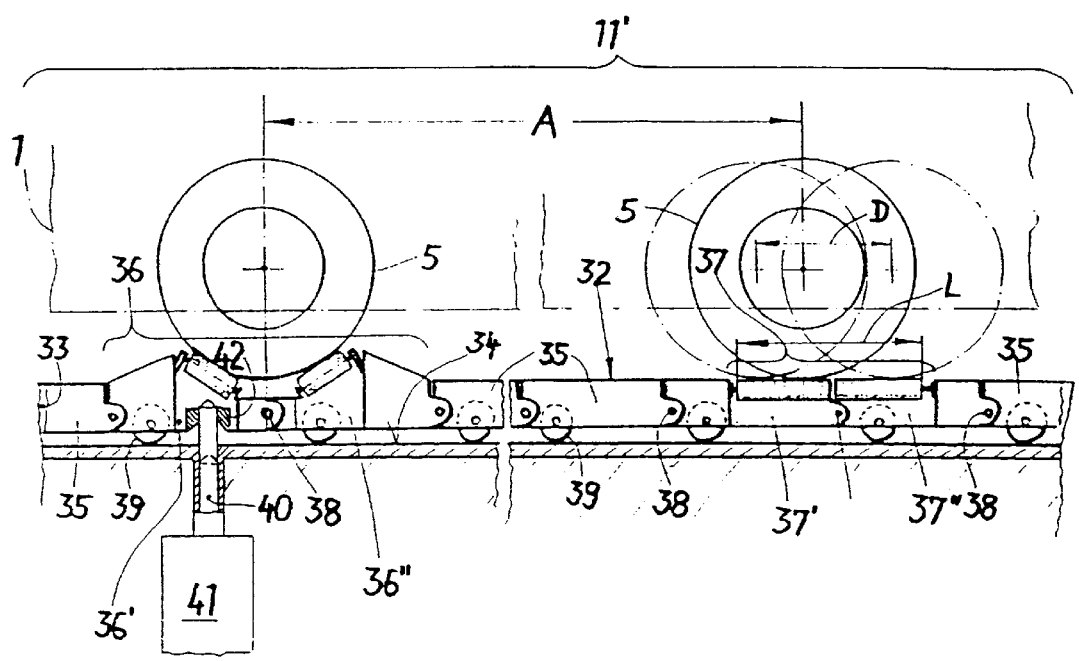
FIG. 10 shows a further exemplary embodiment of the invention, using an apron conveyor with movable wheel wells and wheel stand-on plates integrated into the composite articulated structure of the apron conveyor.

The other basic version of the invention, as illustrated in FIG. 10, will be referred to below. A pair of apron conveyors 32 is provided as conveying lines 12' for conveying the vehicles 1 through the production line from workstation 11' to workstation. The individual apron conveyors are composed of a multiplicity of individual plates 35 which are connected to one another in a hinge-like manner via joints 38. The plates interconnected in the manner of a chain are laid over deflecting wheels in an endless closed loop which can be driven in the conveying direction via one of the deflecting wheels. That strand of the apron conveyor which is moved through the production line in the conveying direction is laid approximately flush with the surface of the work floor with respect to the top side of the plates. For this purpose, in the exemplary embodiment illustrated, a guide channel 33, the base of which forms a guide rail 34, is introduced into the work floor. The supporting rollers 39 of the individual plates can roll, with insignificant resistance, on this guide rail and nevertheless at the same time absorb high carrying loads.

According to the invention, a plurality of wheel wells 36 and wheel stand-on plates 37 are integrated in each case into the right-hand and the left-hand composite articulated structure of the apron conveyors 32 and are moved jointly with the apron conveyors from workstation 11' to workstation. The wheel wells 36 and the wheel stand-on plates 37 correspond, in their function and operation, to the embodiment shown in FIG. 3 and described with reference to the illustration there, so that reference may be made to that extent to the statements made above. A precondition for integrating the wheel wells and the wheel standon plates into the composite articulated structure of the apron conveyors is that the distances between the workstations along the respective production line and the distances between the wheel wells within the composite articulated structure of the apron conveyors correspond to a common grid arrangement. In the simplest instance, the workstations are arranged equidistantly within the production line and the distances between the wheel wells succeeding one another in the composite articulated structure are identical to the distances between stations. At a distance corresponding approximately to the center distance A of the vehicles, a wheel stand-on plate 37 is integrated, behind each wheel well 36, into the composite articulated structure. Both the wheel wells 36 and the wheel stand-on plates 37, like the other plates 35 of the composite articulated structure, too, are supported movably on the guide 34 of the apron conveyors 32 by means of supporting rollers 39.

During the entire run through the production line, a vehicle placed either in a pair of wheel wells or on a pair of wheel stand-on plates of the apron conveyors 32 remains standing on these wheel wells and wheel stand-on plates. A relative displacement of the vehicles in the conveying direction X in relation to the apron conveyors is not possible because of the wheel wells. For positioning the vehicles conveyed on the apron conveyors in the X-direction at the associated workstations, the drive of the apron conveyors is stopped exactly in position.

When the apron conveyors are new and not yet worn, good positioning accuracy is thereby achieved for all workstations. With an increasing age of the apron conveyors, however, wear occurs in the joints 38 of the composite articulated structure and on the driving wheels and, as it accumulates over the large number of points of articulation, may lead to greater tolerances in positioning. To avoid such inaccuracies, at each workstation 11' there is provided in each case an interlocking device, by means of which the wheel wells 36 integrated into the rotating composite articulated structure are not only in each case automatically interlocked mechanically, but can also be accurately positioned in the conveying direction X beforehand. As a result, positioning errors caused by wear or due to errors in the spacing of the individual members 35 or driving wheels can be compensated and eliminated.

For this purpose, an interlocking pin 40 is provided in the floor of each workstation, below the two guide rails 34 for the apron conveyors, and, in the exemplary embodiment illustrated, is guided vertically movably in a fixed guide bush. The said interlocking pin can be moved by remote control, for example, by means of an actuating magnet 41. Other actuating mechanisms and power assistances, such as, for example, pneumatics or hydraulics, may, of course, also be envisaged.

An interlocking orifice 42 for the low-play reception of the interlocking pin is provided on the underside in each wheel well 36. So that the interlocking pin can find the well-side orifice reliably even in a somewhat incorrect position, the interlocking pin 40 is designed conically on the end face, so that, when pressed axially against the margin of the interlocking orifice, it forces the wheel well into the correct position, in which the pin 40 and the orifice 42 are in alignment with one another. The wheel well is automatically forced into the correct longitudinal position as a result of this operation. Since any misalignment of the wheel well with respect to the transverse direction does not need to be corrected, the interlocking pin 40 expediently has a rectangular cross section and the interlocking orifice is designed as a long hole extending in the transverse direction, only those dimensions of the pin 40 and orifice 42 which lie in the conveying direction X matching with one another, and considerable play existing between the two in the transverse direction Y.

As soon as the apron conveyors have come to a standstill after a conveying stroke of the vehicles standing on them, all the interlocking pins on the production line are moved out of the lowered release position, illustrated by broken lines, into the raised interlocking position, illustrated by unbroken lines, in which they also remain during the entire production phase. To move the apron conveyors 32 farther along, the interlocking pins of all workstations 11' are jointly unlocked by remote actuation.

So that the apron conveyors 32 can readily be moved beyond the necessary deflecting wheels in spite of the wheel stand-on plates 37 integrated into the rotating composite articulated structure and/or of the integrated wheel wells 36, in the exemplary embodiment illustrated the wheel stand-on plates 37 and the wheel wells 36 are in each case of multi-part design. The carrying rollers of the wheel stand-on plates are also divided correspondingly. The individual parts 37', 37" of the wheel stand-on plate and the parts 36', 36" of the divided wheel well are connected to one another in a hinge-like manner by means of joints 38 in the same way as the individual plates 35 of the apron conveyors 32.

The centering mechanisms 26, 26', 26" for centering and orienting the vehicles parallel to and symmetrically to the center line of the workstation, the said centering mechanisms being shown in various exemplary embodiments in FIG. 4, in FIGS. 5 and 6 and in FIG. 9, will be dealt with in more detail below. One centering mechanism is provided for each vehicle axle 2 and 3; that is, two centering mechanisms are provided in each workstation 11, 11'. The centering mechanisms are arranged in a stationary manner in the workstations 11 and 11' in both basic versions mentioned (FIGS. 1 to 8 and FIG. 10).

All the centering mechanisms are based in an identical way on a guide member 43, 43' or 43a/43b which is mounted centrally at the position of the center line 24 of the workstation. Two identical kinematic part-gears are built up on these guide members in different directions and are designed symmetrically to one another, each of them carrying a centering edge 25 or 25' on its output member. The two associated kinematic part-gears are coupled positively to one another via the central guide member, in such a way that the two part-gears can execute only movements of equal dimension, but directed opposite to one another. Specifically, the symmetrical movement of the two part-gears is irrespective of whether a force setting the part-gears in motion is introduced asymmetrically into one of the part-gears or whether it is centrally introduced symmetrically. The symmetry of movement of the two part-gears is also irrespective of whether the resistances to be overcome by the output members of the two part-gears are equal or differ greatly.

In the two centering mechanisms 26 illustrated in FIG. 4, the central guide member 43 is designed as a guide bolt which is guided axially movably parallel to the center line 24. By the guide journal being connected to the piston rod of a drive cylinder 44, the guide journal is capable of being driven at the same time pneumatically or hydraulically in the axial direction. Fastened with a vertical pivot axis to the guide journal is a joint, to which are secured in an articulated manner two buckle-proof connecting rods 45 of equal length which extend symmetrically away from the center line on different sides. The other end of each connecting rods is articulated to a lifting journal 46 which is linearly guided transversely to the center line 24 and which, in turn, is mounted axially movably in a straight guide approximately centrally below the wheel well 15 or the wheel stand-on plate 21. Finally, each lifting journal 46 carries a centering edge 25 or 25'. By displaying the guide journal 43 longitudinally in one direction or the other by means of the drive cylinder 44, the two associated lifting journals 46 and, with them the centering edges 25, 25', can be displaced symmetrically in the transverse direction.

Figure 5:
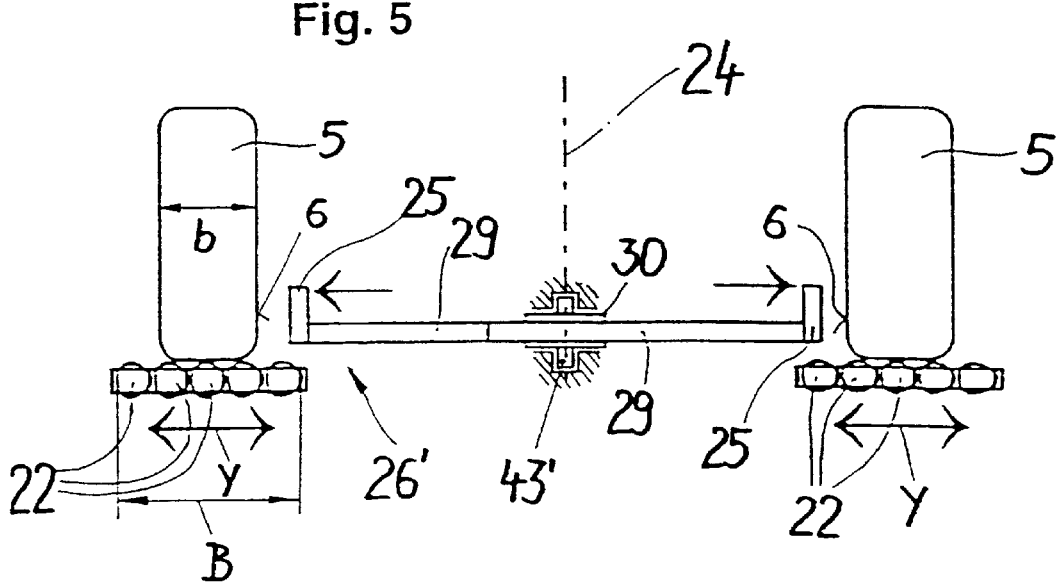
FIGS. 5 and 6 show a vertical cross section and a top view respectively, of a pair of wheel stand-on plates of a workstation with an associated centering mechanism, as a third exemplary embodiment.
Figure 6:
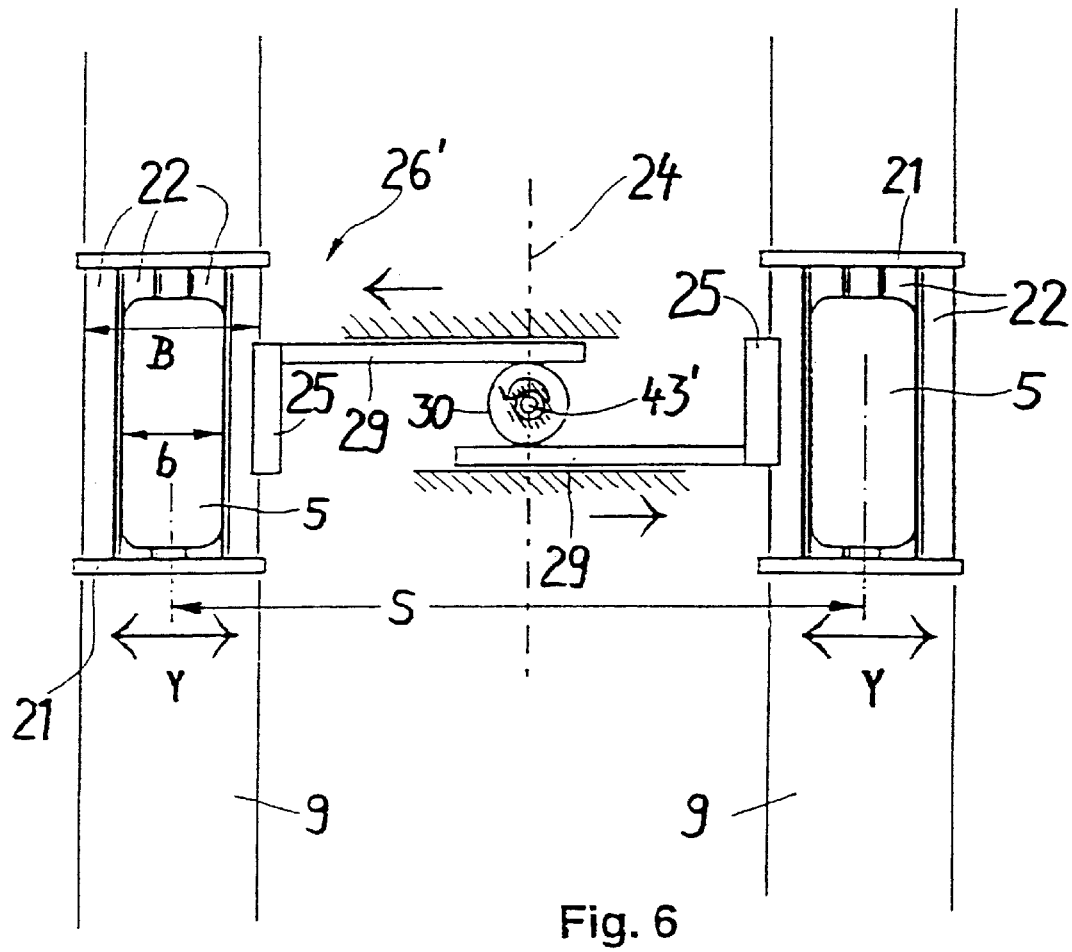

In the two exemplary embodiments of a centering mechanism 26' which are illustrated in FIGS. 5 and 6, the central guide member 43' is designed as a bearing journal of a rotatably mounted gearwheel pinion 30 which is fixedly mounted in the same position with respect to the center line 24, the mounting being arranged, as seen in the longitudinal direction, approximately centrally below the wheel well or the wheel stand-on plate 21. Racks 29 engage at diametrical circumferential points of the gearwheel pinion 30 into the toothing (not shown) of the pinion.

Instead of a toothing or mutual tooth engagement, non-slip rolling between the rack 29 and the fixedly mounted wheel 30 may also be ensured by means of tautly tensioned rolling bands which are looped around the wheel 30 in opposite directions and are fastened at the ends to the rolling surface of the rack 29. The two racks 29 engaging diametrically on the wheel or gearwheel pinion 30 are guided transversely to the center line 24 and mounted axially movably in a linear straight guide. They carry on their ends the centering edges 25 which have already been mentioned. The wheel or gearwheel pinion 30 rotatably mounted at a fixed location and its non-slip rolling engagement with the two racks 29 ensure, in mechanical terms, that a movement introduced anywhere into one of the connected parts is converted into two equal, but oppositely directed movements of the two racks 29 and of the centering edges. The movement drive for introducing such a movement is not illustrated in the exemplary embodiment of FIGS. 5 and 6. It is possible for the gearwheel pinion 30 to be driven by means of a suitable slow rotary drive having limited torque. It is also possible for one of the racks 29 to be pneumatically or hydraulically driven linearly by means of a drive cylinder. Racks 29 engage at diametrical circumferential points of the gearwheel pinion 30 into the toothing (not shown) of the pinion.

Instead of a toothing or mutual tooth engagement, non-slip rolling between the rack 29 and the fixedly mounted wheel 30 may also be ensured by means of tautly tensioned rolling bands which are looped around the wheel 30 in opposite directions and are fastened at the ends to the rolling surface of the rack 29. The two racks 29 engaging diametrically on the wheel or gearwheel pinion 30 are guided transversely to the center line 24 and mounted axially movably in a linear straight guide. They carry on their ends the centering edges 25 which have already been mentioned. The wheel or gearwheel pinion 30 rotatably mounted at a fixed location and its non-slip rolling engagement with the two racks 29 ensure, in mechanical terms, that a movement introduced anywhere into one of the connected parts is converted into two equal, but oppositely directed movements of the two racks 29 and of the centering edges. The movement drive for introducing such a movement is not illustrated in the exemplary embodiment of FIGS. 5 and 6. It is possible for the gearwheel pinion 30 to be driven by means of a suitable slow rotary drive having limited torque. It is also possible for one of the racks 29 to be pneumatically or hydraulically driven linearly by means of a drive cylinder.

Figure 9:
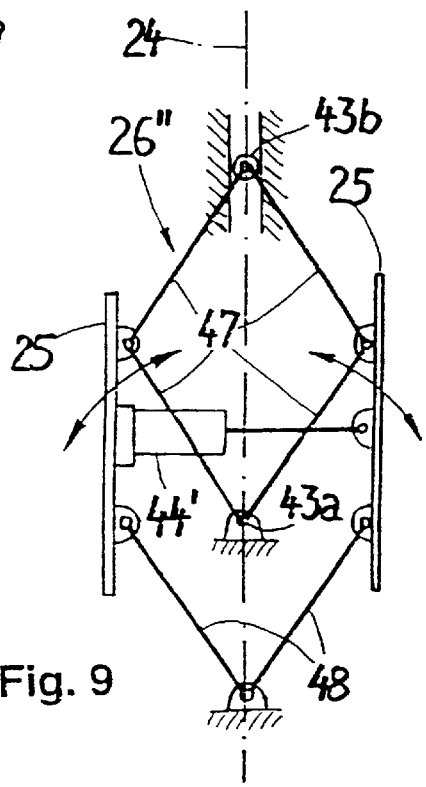
FIG. 9 shows an individual illustration of a further exemplary embodiment of a centering mechanism for the central alignment of a vehicle axle.

In the exemplary embodiment of a centering mechanism 26", as illustrated individually in FIG. 9, the central guide member has a multi-part design. To conform to the generally diamond-shaped design of the two associated kinematic part-gears, which are formed from four articulated buckle-proof connecting rods 47 of equal length, two diametrically opposite corner joints must be fixed on the center line. For this purpose, on the one hand, a fixed bearing 43a and, on the other hand, a bearing 43b guided longitudinally movably are provided. Because two corner points of the diamond-shaped four-bar linkage are fixed centrally, the other two corner points move to the same extent, but opposite to one another, in the transverse direction Y. The centering edges 25 are articulated at these two corner points of the four-bar linkage. So that the centering edges cannot be pivoted, but are moved only parallel to one another (as is necessary in the case of the vehicle axles with non-steerable vehicle wheels), two parallelogram links 48 are also articulated on the centering edges, so as to be offset to the connecting rods 47, and are fixedly mounted with the same offset on the center line. In this exemplary embodiment, the drive cylinder 44' engages directly on the two opposite centering edges. The centering mechanism described no longer needs, here, to convert the drive movement into an output movement, but merely has to ensure that the movement introduced is distributed uniformly and symmetrically to the two opposite centering edges. In this method of introducing the drive movement, the centering mechanism is subjected to mechanical load only when there are widely differing resistances on one side, as compared with the other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. Apparatus for the conveyance and positioning of a vehicle which is supported on its own wheels along a production line having at least one workstation, said apparatus comprising:

for the vehicle wheels, first and second conveying lines arranged adjacent a production line floor, parallel to one another, at a distance corresponding to a gauge of the vehicles, by means of which the vehicle can be conveyed through the production line;

a prismatic shaped wheel well oriented transversely to a conveying direction of the vehicle in each of the conveying lines in a region of a workstation, said wheel wells being arranged in the conveying lines, within the workstation, in an identical position to one another and according to a desired position of the vehicle or of its axle, and being shaped, in cross section, such that variously sized vehicle tires can be received and supported in an exact predetermined position therein relative to the conveying direction of the vehicle, with the vehicle tire supported displaceably in the transverse direction relative to the conveying direction; and a wheel support arranged in each of the conveying lines at a distance between the vehicle axles from the wheel wells, the wheel support comprising one of a transversely movable plate and a set of parallel carrying rollers oriented with the axes of rotation in the conveying direction; wherein the wheel supports are longer in the conveying direction than the sum of the length of a stand-on area of the tire plus at least the difference between the largest and smallest possible center distances;

the width transversely to the conveying direction of the wheel wells and of the wheel supports are dimensioned, taking into account their mutual transverse distance, to accommodate differing gauges and tire widths of all the vehicle types occurring in the production line;

in each workstation, both the two wheel wells belonging thereto and two associated wheel supports have a pair of movably guided centering edges which project above the conveying lines and which can be laid against mirror-symmetrical sides of the two vehicle tires of a vehicle axle received in the wheel wells or standing on the wheel stand-on plates; and a movement drive of each pair of centering edges has a centering mechanism, by means of which the two centering edges located opposite one another in pairs can be moved transversely to the conveying direction, positively in synchronism and symmetrically to the center line of the production line.

2. The apparatus according to claim 1, wherein at least one of the two conveying lines comprises a drag-chain conveyor;

the drag-chain conveyor has a pair of drag chains which are arranged in a respective endless loop parallel to one another at a distance greater than a maximum wheel width, so as to follow, near the floor, a rolling track for the vehicle wheels, and are driven in the conveying direction;

the drag chains of the drag-chain conveyor are provided with a plurality of drivers, each of which can apply a thrust to the tire circumference of a vehicle wheel of a conveyed vehicle;

any conveying line that is not a drag-chain conveyor, it comprises rolling track for the vehicle wheels of the corresponding vehicle side; and each workstation of the production line has an associated set of two stationary wheel wells and two wheel stand-on plates (21, 21').

3. The apparatus according to claim 1, wherein the centering edges assigned to the steerable vehicle axle are held on the centering mechanism (26) pivotably about a vertical pivot axis, the said pivot axis being arranged, as seen in horizontal projection, approximately at the position of a transversely running center line of the steerable vehicle axle of the vehicle.

4. The apparatus according to claim 3, wherein the centering edges pivotable about a vertical pivot axis are assigned to the wheel wells, the pivot axes being arranged, as seen in horizontal projection, approximately at the position of the transversely running center line of the wheel wells.

5. The apparatus according to claim 3, wherein at least the centering mechanism assigned to the steerable vehicle axle has a straight guide for the part carrying pivot axes of the associated centering edges, such that during a transverse movement of opposite centering edges, the pivot axes are movable along a straight line which, as seen in horizontal projection, runs transversely to the conveying direction.

6. The apparatus according to claim 1, wherein the centering edges assigned to the wheel stand-on plates are approximately as long as the wheel stand-on plates.

7. The apparatus according to claim 1, wherein the centering edges assigned to the wheel stand-on plates are connected immovably to the associated centering mechanism.

8. The apparatus according to claim 1, wherein the centering edges are arranged at a mutual transverse distance such that they can be laid in a centering manner against the inner tire flanks and, for centering the vehicle wheels, can be moved outwards away from the center.

9. The apparatus according to claim 1, wherein the inclined flanks, absorbing the wheel load, of the wheel wells are arranged immovably with respect to their inclination or their mutual distance, and comprise transversely floatingly guided plates or are formed by a set of parallel carrying rollers, of axes of rotation of which, as seen in horizontal projection, are oriented parallel to the conveying direction.

10. The apparatus according to claim 1, wherein flanks of the wheel wells are movable with respect to their inclination or to their mutual separation; and a horizontal bottom of the wheel wells which absorbs the wheel load is designed as one of a transversely floatingly guided plate and a set of parallel carrying rollers having axes of rotation oriented parallel to the conveying direction.

11. The apparatus according to claim 1, wherein the two conveying lines carrying the vehicle wheels and conveying the vehicles through the production line are designed as one of slat and apron conveyors, and contain at uniform distance corresponding to a distance between successive workstations, so as to be integrated into the rotating composite articulated structure of the slat or apron conveyors, a plurality of wheel wells supported movably on the guide of the slat or apron conveyors and a plurality of correspondingly movably supported wheel stand-on plates.

12. The apparatus according to claim 11, wherein in a workstation, a device is provided for automatic mechanical interlocking and exact positioning of the wheel wells which are integrated into the rotating composite articulated structure of the slat or apron conveyors and are capable of being moved on the conveyor guide and which, when the slat or apron conveyors move farther on, are capable of being unlocked by remote actuation jointly for all workstations.

13. The apparatus according to claim 11, wherein the wheel supports integrated into the rotating composite articulated structure of the slat or apron conveyors or the integrated wheel wells are in each case of multi-part design, the individual parts of each wheel support or of each divided wheel well being connected to one another in an articulated manner in the same way as the individual plates or the individual slats of the apron or slat conveyors.

14. The apparatus according to claim 1, wherein in a workstation, an apparatus for the mechanical fixing of the body of the positioned vehicle is provided, the said device having centering pins which move axially into body-side jack bushes and thereby position the vehicle body even more accurately with respect to all three spatial directions.

* * * * *